United States Patent [19]

Grimsley

[11] Patent Number: 4,463,633

[45] Date of Patent: Aug. 7, 1984

[54] PORTABLE BORING AND REFINISHING TOOL FOR END-LOADING BALL VALVES

[76] Inventor: Ernest E. Grimsley, 4533 Wake Forest Rd., Portsmouth, Va. 23703

[21] Appl. No.: 287,675

[22] Filed: Jul. 28, 1981

[51] Int. Cl.³ .............................................. B23B 5/06
[52] U.S. Cl. .................................... 82/4 R; 408/137; 408/709
[58] Field of Search ................. 82/4 R, 4 C, 1.2, 1 A; 408/129, 137, 709; 51/241 VS

[56] References Cited

U.S. PATENT DOCUMENTS

| | | | |
|---|---|---|---|
| 1,326,169 | 12/1919 | Beck | 408/709 |
| 1,470,641 | 10/1923 | Pochila | 82/4 R |
| 2,283,323 | 5/1942 | Erhardt | 82/2 E |
| 2,518,929 | 8/1950 | Peters | 82/4 R |
| 3,141,365 | 7/1964 | Peters | 82/4 R |
| 3,350,964 | 11/1967 | Brooks | 82/4 R |
| 4,011,793 | 3/1977 | Grimsley | 90/12.5 |
| 4,114,483 | 9/1978 | Grimsley | 82/1.2 |
| 4,161,127 | 7/1979 | Tiffin | 82/4 R |
| 4,241,623 | 12/1980 | Wilger et al. | 408/129 |
| 4,322,991 | 4/1982 | Feamster | 82/4 R |

FOREIGN PATENT DOCUMENTS 174783 1/1953 Fed. Rep. of Germany ....... 82/4 R

Primary Examiner—Leonidas Vlachos
Assistant Examiner—Jerry Kearns
Attorney, Agent, or Firm—Griffin, Branigan & Butler

[57] ABSTRACT

A portable tool for selectively boring and refinishing one or more seating surfaces (30, 32) of end-loading ball valves. A cutter head assembly 146 bearing a tool bit 190 is translatable in an axial direction through the threaded cooperation of axial adjustment means 72 and the interior surface of a tool housing 68. The bit 190 is radially displacable when desired by the engagement of a radial feed mechanism, the engagement being effected by a bar member 122 selectively movable in a direction parallel to the axis of the tool. A cap 125 cooperates with an essentially flat chord-like portion 120 of the exterior of housing 68 to provide a channel through which the bar member 122 extends. The bit 190 includes the lowermost extremity of the cutter head assembly 146 and, in at least some positions of the bit 190, the greatest radial extremity of the cutter head assembly.

6 Claims, 8 Drawing Figures

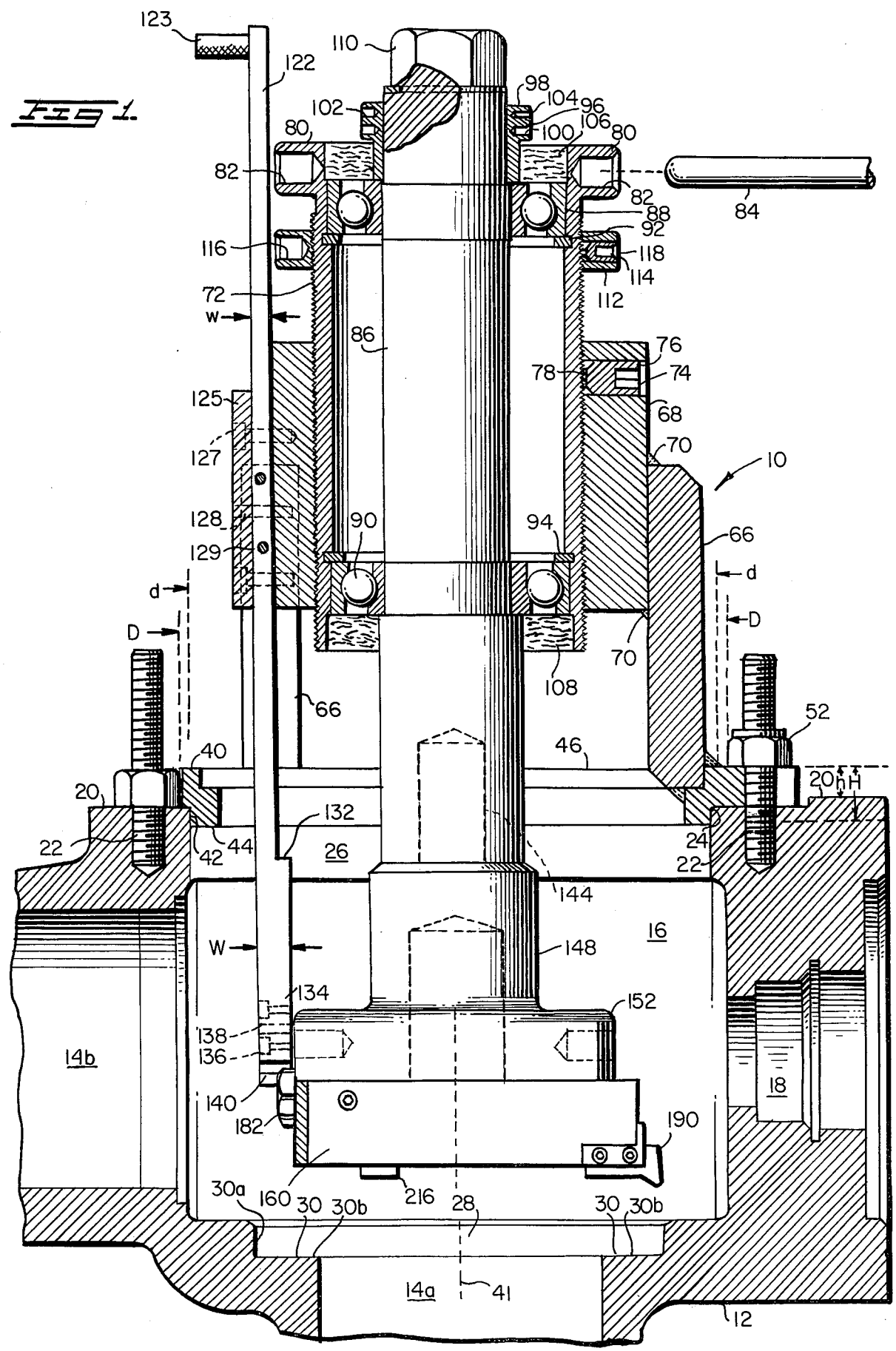

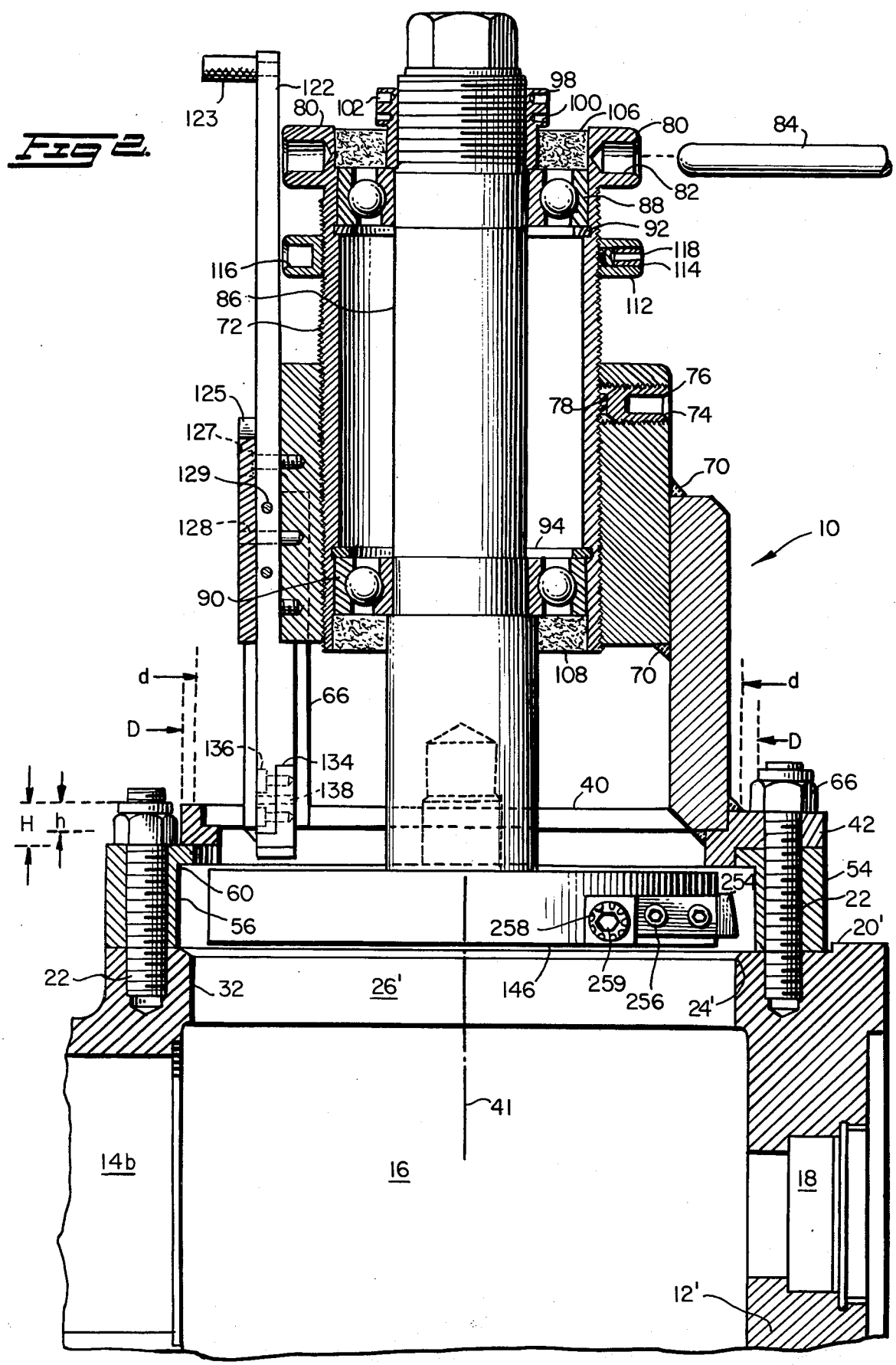

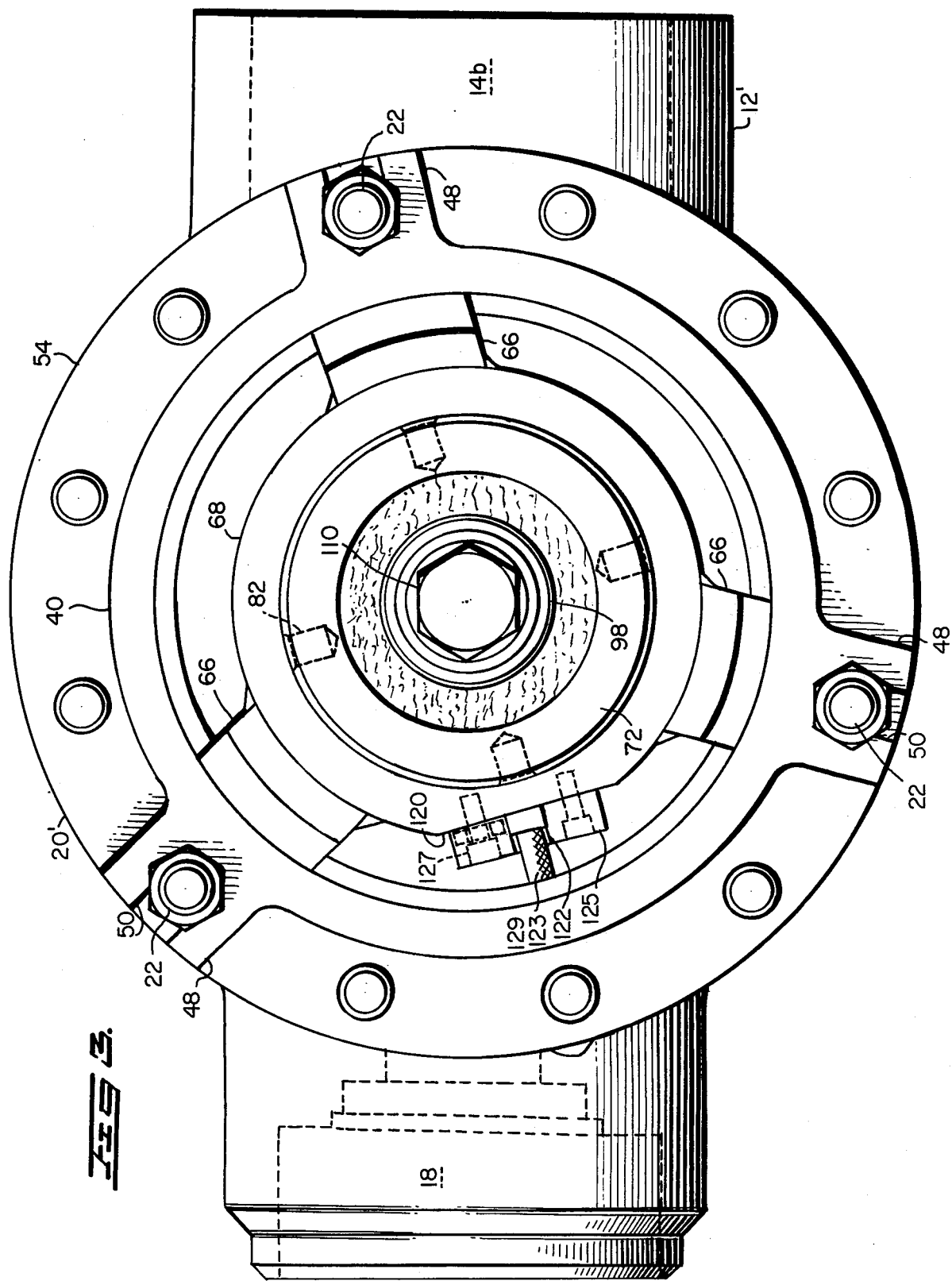

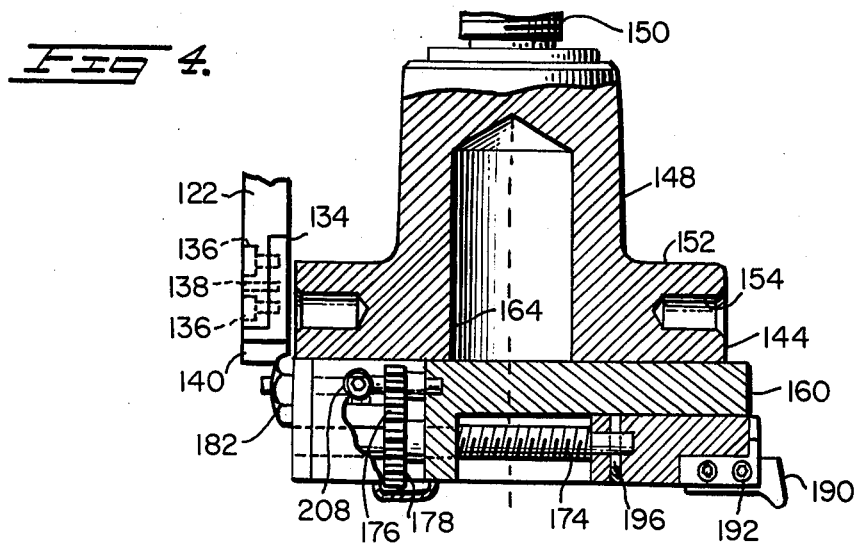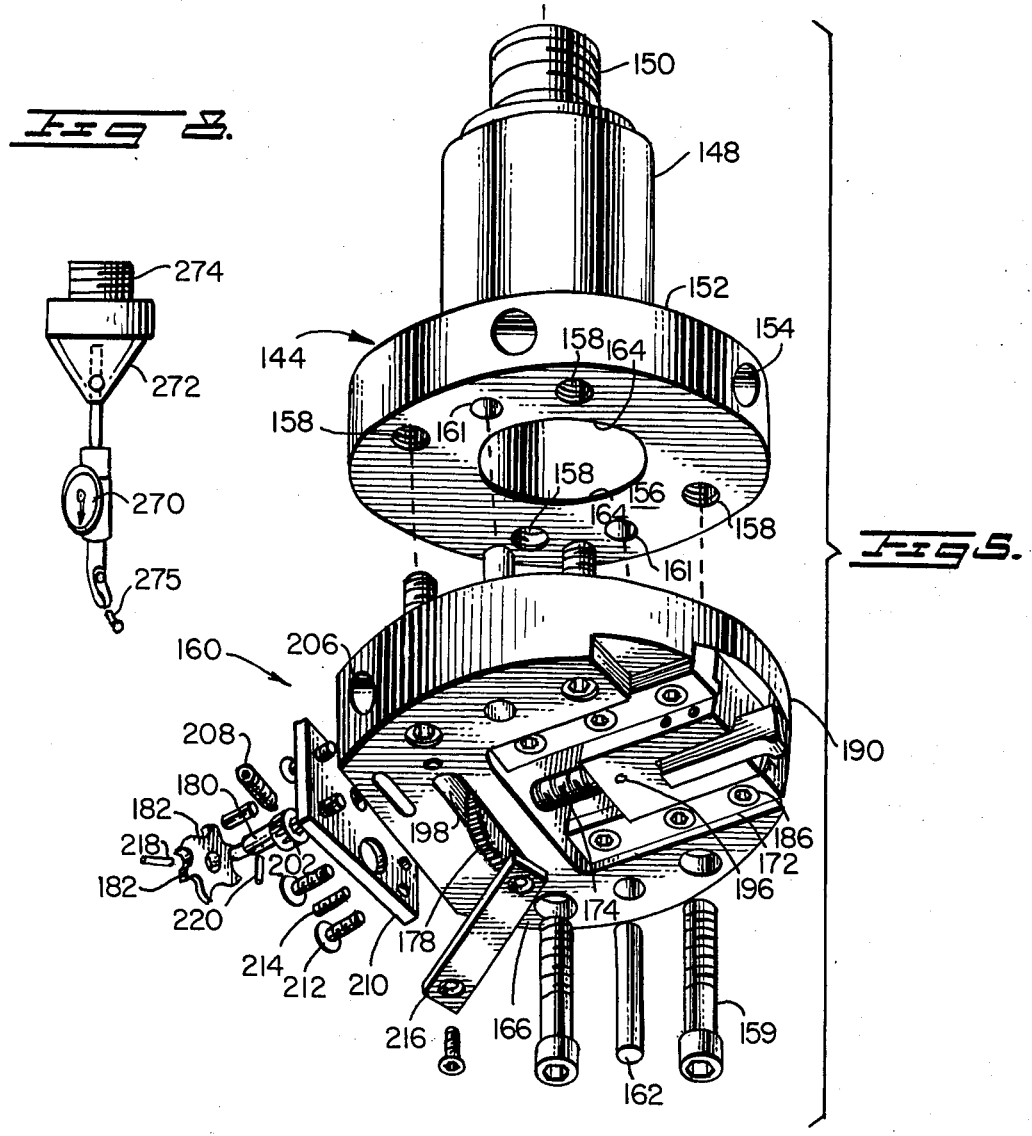

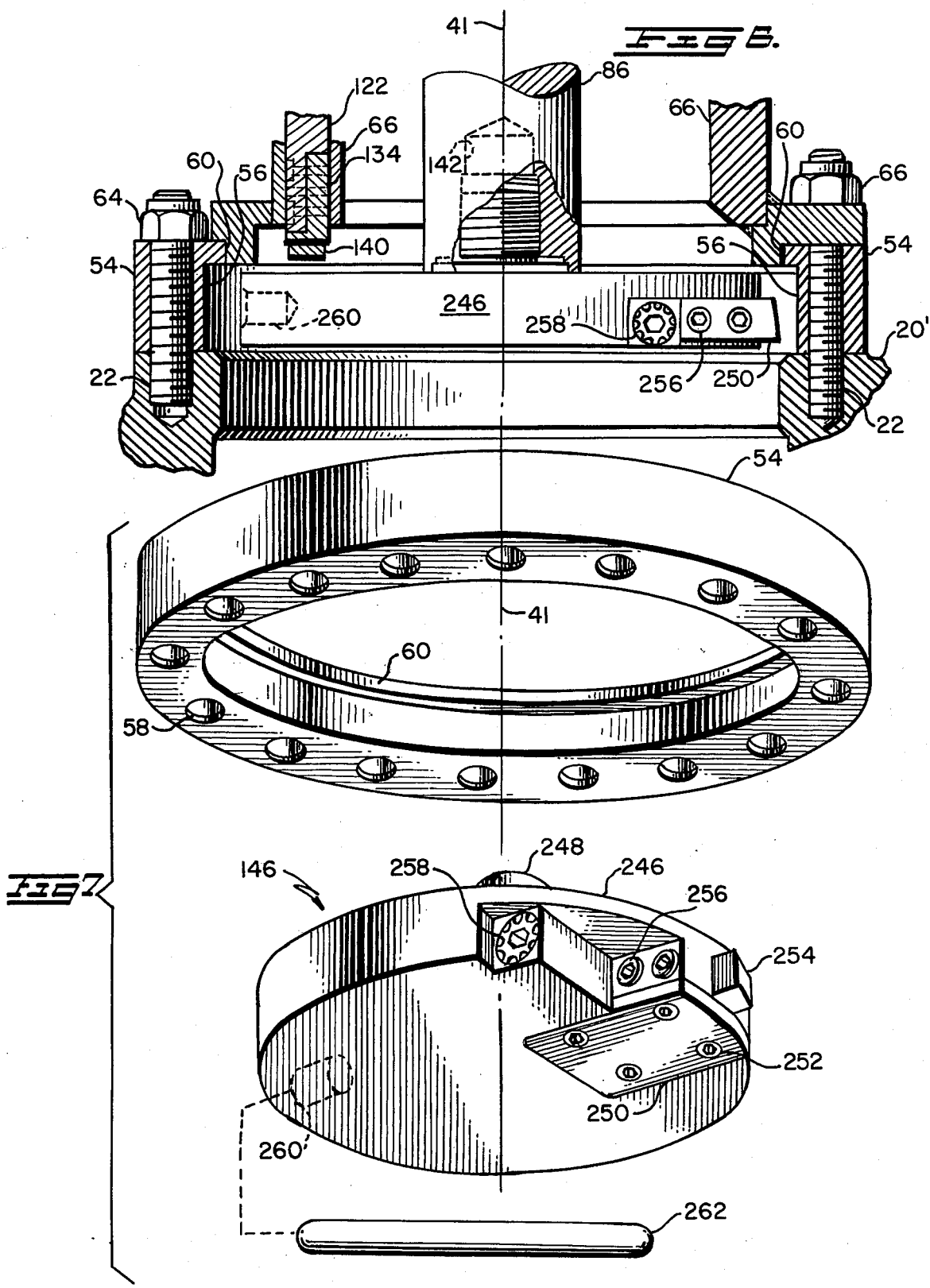

PORTABLE BORING AND REFINISHING TOOL FOR END-LOADING BALL VALVES

BACKGROUND OF THE INVENTION

This invention pertains to a portable tool for boring and refinishing seating surfaces in a ball valve, particularly and end-loading ball valve.

U.S. Pat. No. 4,114,483 provides a portable boring tool for refinishing the seal ring seating surfaces in a top-loading ball valve. In top-loading ball valves the ball depends by a lever mechanism into a valve body from a valve bonnet and is interposed between two oppositely-facing seating surfaces. The seating surfaces are both oriented approximately one degree from the perpendicular to a planar top surface of the valve. Unlike prior art devices, the tool disclosed in U.S. Pat. No. 4,114,483 facilitates the refinishing of top-loading ball valve seating surfaces in-line without removing the valves from the fluid lines they are controlling. The tool comprises a housing which contains gearing for ultimately transmitting motion from an input drive shaft to a cutter head assembly. The cutter head assembly is adapted to cut successively smaller circles of material from the surface being refinished.

Another type of ball valve, known as an end-loading ball valve, basically differs from the top-loading ball valve in that the lever mechanism enters the valve body laterally through a side opening rather than depending from the bonnet. In end-loading ball valves, selective communication occurs through two or more ports which communicate with a chamber in the valve body. The ball rotatably resides in the chamber and bears against a lower ball seal ring fitting in a lower seating surface which lies in a plane essentially parallel to the planar top surface of the valve body. An upper ball seal ring fits in an upper seating surface which resides in the valve bonnet. The lower and upper ball seal rings both bear tightly against the ball but allow the ball to rotate. Depending on the rotational position of the ball, passages through the ball selectively permit the flow of fluid therethrough from one port to another port. In this regard, the bonnet of some types of ball valves is often provided with a port and an elbow fitting.

Some end-loading ball valves additionally have a seal ring such as an O-ring which fits in a seating surface lying in a plane parallel to and near the valve body top surface to form a seal between the valve body and a portion of the bonnet which fits into the valve body. In other end-loading ball valve configurations, however, the bonnet fits on the valve body without the need for such a seal ring.

The seating surfaces for the seal rings in an end-loading ball valve can develop leaks and need to be refinished to remove corrosion, cuts, and porous regions. The tool provided in U.S. Pat. No. 4,114,483, however, is not adapted to refinish the seating surfaces in end-loading ball valves since such seating surfaces lie in planes parallel to the valve top surface. Hence, hitherto it has been customary to remove end-loading ball valves from the lines, transport them to a remote location where they are refinished, and then return them to their initial site. This procedure is both time-consuming and costly.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 1 is a partially cross-sectioned side view of a refinishing tool mounted on a valve body of an end-loading ball valve for refinishing a seating surface for a lower ball seat ring;

FIG. 2 is a partially cross-sectioned side view of a refinishing tool mounted on a valve body of an end-loading ball valve and adapted to refinish a seating surface for an O-ring;

FIG. 3 is a top view of the refinishing tool shown in FIG. 2;

FIG. 4 is a cross-sectional side view of elements of a refinishing tool as shown in FIG. 1;

FIG. 5 is an exploded perspective view of FIG. 4;

FIG. 6 is a cross-sectional view of elements of a refinishing tool as shown in FIG. 2;

FIG. 7 is an exploded perspective view of FIG. 6; and,

FIG. 8 is a perspective view of an indicator gauge.

DETAILED DESCRIPTION OF THE DRAWINGS

FIG. 1 shows a portable refinishing tool 10 mounted in the position of use on top of a valve body 12 of a conventional end-loading ball valve. The valve body 12 has inlet and outlet ports 14a, 14b which are essentially orthogonally oriented to one another and which communicate with a chamber 16. Normally, chamber 16 contains a ball or movable valving element together with a laterally-extending lever mechanism which enters the valve body 12 through a side opening 18 in the valve body 12. A top surface 20 of the valve body 12 is essentially flat and has a plurality of valve studs 22 extended upwardly therefrom in a circular pattern. A valve bonnet (not illustrated) has a plurality of corresponding apertures which fit over the valve studs 22 and facilitate fastening of the bonnet to the top surface 20. The type of bonnet used in conjunction with the valve body 12 of FIG. 1 snugly fits against a relatively sharp circumferential rim 24 of the valve body top surface 20 and seals itself into an annular opening 26 defined by the perimeter of top surface 20 above the valve chamber 16. The valve bonnet has formed therein an upper seating surface wherein an upper ball seal ring resides.

The direction of flow through port 14a of valve body 12 is essentially perpendicular to the plane of the top surface 20. An annular opening 28 having a diameter greater than the diameter of the port 14a is formed at the intersection of the port 14a and the chamber 16. The opening 28 is defined by an annular seating surface 30 comprising a sidewall 30a and a bottom wall 30b. The seating surface 30 lies in a plane essentially parallel to the plane of the top surface 20 of the valve body 12. The seating surface 30 is adapted to accommodate therein a lower ball seal ring.

FIG. 2 shows a portable refinishing tool 10 mounted in the position of use on top of a valve body 12'. Valve body 12' of FIG. 2 basically resembles the valve body 12 of FIG. 1 but differs in that the type of valve bonnet (unillustrated) used with this type valve body has an O-ring (unillustrated) therearound which facilitates the sealing of the bonnet onto a top surface 20' of the valve body 12'. In this respect, the circumferential rim 24' of the top surface 20' is bevelled and is contiguous with a sidewall 32 of the annular opening 26' in the valve body 12'. The annular opening 26' lies in a plane essentially parallel to the plane of the top surface 20' of the valve body 12' so that its sidewall 32 forms a seating surface against which the O-ring bears when the valve is assembled.

The refinishing tool 10 of FIGS. 1 and 2 comprises an essentially toroidal base plate 40. When mounted in a position for use, the base plate 40 has an axis 41 which is coincident with (and hereinafter synonymous with) the longitudinal axis of the tool 10.

A circumferential groove 42 is provided on a bottom surface 44 of the base plate 40 such that the outer diameter d of the bottom surface 44 is less than the outer diameter D of a top surface 46 of the base plate 40. A height dimension h extending from the top surface 46 of the base plate 40 to the top of the groove 42 is less than the height dimension H of the base plate generally (that is, from the top surface 46 to the bottom surface 44).

The base plate 40 is provided with a plurality of spider-like arms 48 which, as seen in FIG. 3, extend in a radial direction from the base plate 40. Although only three such arms 48 are depicted in FIG. 3, it should be understood that a base plate 40 may be fabricated with any suitable number of such arms. Each arm 48 is of the height h and extends from the plane of the base plate top surface 46 to the top of the circumferential groove 42. Each arm 48 is formed with a U-shaped opening 50 adapted to receive one of the corresponding valve studs 22 which extends upwardly from the valve body top surface 20.

In the position of use shown in FIG. 1, the base plate 40 is mounted directly on the top surface 20 of the valve body 12. In this respect, the circumferential groove 42 on the underside of the base plate allows the base plate 40 to be shouldered on the essentially sharp circumferential rim 24 of the valve body top surface 20. As the spider arms 48 of the base plate 40 fit over corresponding valve studs 22 and are secured thereon by locking members (such as nuts 52), the base plate 40 is effectively seated on and secured to the top surface 20 of valve body 12.

In the position of use shown in FIG. 2, on the other hand, an essentially toroidal adaptor means (such as adaptor ring 54, seen in FIG. 7) is mounted on the upper surface 20' of the valve body 12' (as in the manner seen in FIG. 6). The adaptor ring 54 is provided with an undercut circumferential groove 56 at its bottom surface along its inner diameter. Axially extending apertures 58 are provided in a circular pattern around the adaptor ring 54 and are adapted to receive corresponding valve studs 22. Above the undercut cicumferential groove 56 of the adaptor ring 54 is an annular shoulder 60 which is formed to support the base plate 40.

In the above regard, the undercut circumferential groove 42 of the base plate 40 fits onto the annular shoulder 60 of the adaptor ring 54. Thus, the adaptor ring 54 serves to elevate the base plate 40 above the plane of the top surface 20' of the valve body 12'. When assembled in this manner, most of the valve studs 22 engage apertures 58 in the adaptor ring 54 and are then anchored on the valve body 12'. Such valve studs are locked into position by locking means illustrated as nuts 62. A few valve studs additionally extend through the openings 50 in the spider arms 48 and are locked in position with nuts 66.

The tool 10 includes a tool housing. The tool housing is comprised of a plurality of upwardly-extending arcuate support members 66 which are essentially concentric with respect to axis 41. As shown in FIGS. 1 and 2, the support members 66 are welded to the base plate 40 at points along the inner periphery of the base plate top surface 46. As seen from above (FIG. 3) the arcuate support members 66 are positioned on interior peripheral positions corresponding to extensions of the spider arms 48.

The tool housing further comprises a hollow cylindrical member 68 having its axis coincident with axis 41. The outer circumferential surface of the cylindrical member 68 is of a radius just slightly smaller than the radius of the inner surfaces of the support members 66. The cylindrical member 68 is welded at points 70 so as to be essentially mounted on the support member 66.

The interior surface of the hollow cylindrical member 68 is counter-threaded to receive an adjustment means, or adjustment carriage 72. The adjustment carriage 72 is essentially a hollow cylinder and is concentric about the axis 41. The outer peripheral surface of the carriage 72 is threaded so that the carriage 72 may travel in a longitudinal direction along the axis 41 as the carriage rotates. Adjustment carriage 72 may be locked in position by selectively tightening a plurality of threaded set screws 74 which are radially received through counter-threaded apertures 76 in the upper end of the cylindrical member 68. When tightened, nylon tips 78 on the set screws 74 bear against the threaded exterior peripheral surface of the carriage 72.

The upper end of the carriage 72 has a rim 80 extending radially outwardly therefrom. A plurality of radially extending rim apertures 82 are spaced circumferentially about and partially penetrate the rim 80. The apertures 82 are adapted to receive a feed pin 84.

Rotational motion transmitting means, such as drive shaft 86, extends axially through the carriage 72 and is rotatably mounted therein. Rotation of the drive shaft 86 is facilitated by upper and lower bearings 88 and 90, respectively. The bearings 88 and 90 are precluded from axial movement into the interior of the carriage 72 by upper and lower retainer rings 92 and 94, respectively.

At its emergence from the top end of the carriage 72, the exterior of the drive shaft 86 is threaded to accommodate both an internally counter-threaded thrust ring 96 and an internally counter-threaded locking ring 98. Both thrust ring 96 and locking ring 98 have radially extending counter-threaded apertures 100 and 102, respectively, circumferentially spaced thereabout to accommodate corresponding threaded set screws (such as set screw 104 in locking ring aperture 102).

Each end of the carriage 72 receives an oil seal which fits over the respective end portions of the drive shaft 86. In this regard, an upper oil seal 106 is provided at the top of the carriage 72 and a lower oil seal 108 is provided at its bottom.

At its top end 110 the drive shaft 86 is formed in hexagonal fashion as an input drive means to accommodate an appropriate driving motor. In this respect, any suitable drive means may be fitted over the hexagonally-shaped end 110 to rotate the drive shaft 86. A GHOT-CWL-1609 Triple Geared Motor is suitable for this purpose.

A retainer ring 112 is internally counter-threaded to fit over the threaded exterior of the carriage 72. Retainer ring 112 is adapted to rotate to achieve longitudinal displacement for selective positioning in the axial direction. Spaced about the periphery of the retainer ring 112 are a plurality of counter-threaded, radially extending apertures 114 and a plurality of radially extending apertures 116. The apertures 114 receive corresponding set screws 118 having nylon tips which, when tightened, lock the retainer ring 112 into a desired position on carriage 72. The apertures 116 are adapted to receive a feed pin or the like (not illustrated) for manually rotating the retainer ring 112).

As best seen in FIG. 3, a chord is cut along a lateral portion of the periphery of the cylinder 68 so that an essentially flat surface 120 is formed thereon. The flat surface 120 facilitates the positioning thereagainst of an essentially elongated cross-feed bar 122 of rectangular cross-section. The cross-feed bar 122 has a handle or knob 123 at its upper end. The positioning of the cross-feed bar 122 is variable along the direction of axis 41 so that a lower end thereof may selectively extend to a predetermined depth into the valve chamber 16 (as shown in FIG. 1).

The cross-feed bar 122 is secured to the cylinder 68 by a cap 125. As seen from above (FIG. 3) cap 125 is essentially rectangular in cross-section but has a hollow channel oriented against the flat surface 120 of the cylinder 68. The cap 125 is secured to the flat surface 120 of cylinder 68 by four threaded fasteners 127. A dowel pin 128 also extends through the cap 125 and into the cylinder 68. The cross-feed bar 122 is insertable in the hollow channel of cap 125 in the axial direction and is locked therein at a desired position by the selective tightening of two set screws 129. The set screws 129 bear against the side of the cross-feed bar 122 as they extend laterally from the side of the cap 125.

A top portion of the cross-feed bar 122 has a width w which is smaller than the width W of the cross-feed bar 122 lower portion. In this respect, a lower portion of the cross-feed bar 122 has a shoulder 132 at a point where its width is incremented from w to W. Thus, as seen in FIG. 2, when the cross-feed bar 122 is raised to its full height so that it is completely above the bottom of the base plate 40, the shoulder 132 abuts an underside portion of the cylinder 68.

The lower end of cross-feed bar 122 is notched longitudinally approximately halfway through its width W to receive a cross-bar tip member 134. The cross-feed bar tip member 134 is secured to the lower end of the cross-feed bar 122 by a plurality of fasteners, such as two set screws 136 and a dowel pin 138, which extend through bar 122 and member 134 in a direction essentially perpendicular to the axis of elongation of the bar 122. A distal end of the cross-bar tip member 134 has a cylindrical member 140 formed thereon such that the major axis of the cylinder 140 is perpendicular to the longitudinal axis of the cross-feed bar 122.

As seen in FIG. 6, at its lower end the drive shaft 86 is bored and counter-threaded as indicated at 142. As seen in conjunction with FIGS. 1 or 2 respectively, the internally threaded bore 142 in the drive shaft 86 is adapted to accommodate either an extension means 144 or a cutter assembly 146.

The extension means 144 comprises an intermediate cylindrical member 148. An externally threaded cylindrical stem 150 having a smaller diameter than the diameter of the member 148 extends from an upper end of the cylindrical member 148. In this respect, the theaded stem 150 is adapted to be received into the counter-threaded bore 142 of the lower end of the drive shaft 86.

Integral with the bottom end of the cylindrical member 148 is a disc-shaped portion 152 having a diameter greater than the diameter of the cylindrical member 148. A plurality of apertures 154 are spaced about the circumference of the disc 152 and extend therein in a radial direction. The apertures 154 are adapted to receive a feed pin or the like.

A plurality of apertures opening onto a disc lower surface 156 extend partially through the disc 152 in an axial direction. As illustrated in FIG. 5, four such apertures (labeled 158) are counter-threaded to engage corresponding fasteners (such as threaded screws 159) on a cutter head assembly 160. Two of these apertures (labeled 161) are adapted to receive corresponding dowel pins 162 which are mounted on the cutter head assembly 160. The fasteners 159 and pins 162 secure the cutter body assembly 160 to the extension 144, and hence to the drive shaft 86. The lower disc surface 156 also has a central aperture extending therefrom in an axial direction through the disc 152 and partially through the cylindrical member 148.

As the drive shaft 86 rotates in the manner hereinafter described, the entire cutter head assembly 160 rotates therewith. The cutter head assembly comprises a generally circular cutter body 166, a tool block 168, first and second tool block guide members 170 and 172, a threaded feed shaft 174, two feed gears 176 and 178, a feed shaft 180, and a star feed gear 182. The cutter head assembly 160 basically resembles a cutter head assembly disclosed in U.S. Pat. No. 4,114,483 which is incorporated herein by reference. In this regard, the cutter head assembly 160 includes such elements as a rectangular recess 184 in the cutter head 166; screws 186 securing the tool block guide members 170 and 172 to the cutter body 166; a tool bit 190; set screws 192 securing the tool bit 190 to the tool block 168; a recess 194 in the cutter body 166; a retaining pin 196 tying feed shaft 174 to the tool block 168; an elongated slot 198 in the cutter body 166; an unthreaded hole 200 in the cutter body 166; a collar 202 on shaft 180; a slot 204 in the cutter body 166; a hole 206 in the cutter body 166; and, a spring-loaded detent mechanism 208 loaded through hole 206.

In addition to the elements of the cutter assembly 160 such as those disclosed in U.S. Pat. No. 4,114,483, the cutter head assembly 160 of FIG. 5 also comprises a plate 210 secured to a flat chord-like portion of the cutter body 166 by a plurality of threaded fasteners 212 and dowel pins 214. A gear cover 216 is provided to cover the slot 198 wherein are contained the gears 176 and 178. Roll pins 218 and 220 are receivable through the shaft 180.

With reference now to FIG. 2, as aided by FIGS. 6 and 7, the cutter head assembly 146 comprises a cutter body 246 which has on an upper surface thereof a cylindrical threaded stem 248 adapted to be received into the counter-threaded bore 142 of the lower end of the drive shaft 86. Upon threaded engagement of the stem 248 with the bore 142, the cutter head assembly 146 is secured to the drive shaft 86, and hence to the tool 10, in the manner depicted in FIG. 6. A portion of the bottom surface of cutter body 246 is recessed to accommodate an essentially rectangular-shaped plate 250 which is secured to the cutter body 246 by a plurality of appropriate fasteners, such as the four set screws shown and labeled as 252. An end of the plate 250 is curved so as to maintain the circular configuration of the cutter body 246.

Above the plate 250 an aperture of essentially square cross-section extends from the periphery of the cutter body 246 inwardly in a radial direction and receives therein a tool bit 254. A cutting portion of the tool bit 254 protrudes from the peripheral surface of the cutter body 246. A portion of the cutter body 246 is recessed to allow access to two set screws 256 which extend through a portion of the cutter body 246 to secure the tool bit 254 therein. The recessed area also has an aperture 258 which receives an adjustment screw 259. The adjustment screw 259 is tapered at its interior end (unillustrated) to provide a camming surface which acts against an interior portion of the tool bit 254 to adjust the radial cut. The screw 259 is provided with graduated markings to indicate the amount by which the radial cut is being changed.

The cutter body 246 has at least one radially extending aperture 260 along its periphery adapted to receive a feed pin 262. Insertion of the feed pin 262 into the aperture 260 facilitates manual rotation of the cutter head 246.

FIG. 8 illustrates a conventional indicator gauge 270 adapted to be suspended from a conical member 272. The top flat surface of the conical member 272 has a threaded cylindrical stem 274 extending upwardly therefrom adapted to threadingly engage the bore 142 in the lower portion of the drive shaft 86. A portion of the gauge 270 depending from the conical member 272 is pivotable about screw 275 so that the depending portion may extend horizontally rather than vertically as shown.

In operation, the tool 10 is used in the manner of FIG. 2 to refinish the seating surface 32 of the valve body of the type of valve body 12'. In order to utilize the tool 10, the valve bonnet and all operating gear (unillustrated) are removed from the valve body 12'. Then, valve openings such as ports 14 and side opening 18 are plugged to eliminate entry of foreign matter into the system. The adaptor ring 54 is then placed over the circular opening 26 in the top surface 20' of the valve body 12'. The base plate 40 is then placed on top of the adaptor ring 54 such that openings 50 in spider arms 48 are selectively aligned with valve studs 22. Nuts 66 are placed over appropriate valve studs 22 and secured just tightly enough to hold the adaptor ring 54 and the base plate 40 (and hence the tool 10) onto the valve body 12'. Either before or after mounting the base plate 40 in the just described manner, the indicator gauge 270 is secured via its threaded stem 274 to the lower end of the drive shaft 86.

With the indicator gauge 270 mounted to the lower end of the drive shaft 86, and with the depending portion of the gauge 270 assuming a horizontal posture, the drive shaft 86 is rotated and readings on the indicator gauge 270 continually monitored to insure that the tool 10 is correctly aligned with respect to the seating surface 32. If the tool is not in correct radial alignment with respect to the axis 41, the adaptor ring 54 (and hence the tool 10) may be displaced radially as required until alignment is achieved. Nuts 66 may be selectively tightened and/or loosened to facilitate proper alignment. Once aligned, nuts 62 are secured onto the studs 22.

After alignment has been completed, the indicator gauge 270 is removed from the lower end of drive shaft 86 and replaced with the cutter head assembly 146. In this respect, threaded stem 248 of the cutter head assembly 146 is secured in the counter-threaded aperture 142 of the lower end of the drive shaft 86. The manual feed pin 84 is inserted into a rim aperture 82 of the adjustment carriage 72 to manually rotate the carriage 72 thereby causing axial displacement of the drive shaft 86. In this manner, the tool bit 254 can be axially positioned relative to the surface to be refinished.

If the bevelled circumferential rim 24' needs to be refinished, an appropriate tool bit (unillustrated) having a tip angled to produce the desired inclination for the bevel is secured in the cutter head assembly 146 by screws 256. The radial position of the tool bit is adjusted as desired by using the adjustment screw 259 and set screws 256. With the tool bit flush against the rim 24', the retainer ring is positioned to lie flush on the top of cylindrical member 68. Once fasteners 118 in the retainer ring 112 are tightened, the drive motor is attached to top end 110 of the drive shaft 86 so that the tool bit travels in a circular path and refinishes the bevelled rim 24'.

If the sidewall 32 of annular opening 26 is to be refinished, an appropriate tool bit, such as that illustrated as 256, is positioned axially as described above to be near the top of the sidewall 32. The radial position of the tool bit 256 is adjusted by using the adjustment screw 259 and set screws 256. The retainer ring 112 is then rotated to a position above the top of the cylindrical member 68 such that the distance separating the retainer ring 112 and the cylindrical member 68 corresponds to the height of the sidewall 32. At this position fasteners 118 in retainer ring 112 are tightened to preclude further axial movement of the carriage 72 once the carriage 72 has rotated sufficiently to displace it to the extent that the retainer ring 112 is flush against the top of the cylindrical member 68. Once the positioning is achieved, the drive motor attached to the top end 110 of the drive shaft 86 causes the drive shaft 86 and the cutter head assembly 146 secured thereto to rotate so that the tool bit 254 travels in a circular path about the upper seating surface 32.

After the O-ring seating surface 32 has been refinished in the above-described manner, the tool 10 with the cutter head assembly 146 thereon is removed from the adaptor ring 54. In this respect, the nuts 52 holding the base plate 40 to the adaptor ring 54 are removed from studs 22 so that the tool 10 may be lifted above the valve body 12'. The extension means 144 with cutter head assembly 160 attached thereto (in the manner hereinbefore described) is then secured via threaded stem 150 into the counter-threaded aperture 142 of the lower end of the tool drive shaft 86. With the adaptor ring 54 still mounted in correct alignment on the top surface 20' of valve body 12', the tool is positioned over the valve body 12' so that nuts 52 may be placed back upon studs 22 and base plate 40 again secured to the adaptor ring 54.

In order to refinish the sidewall 30a of the lower ball seal ring seating surface 30, the radial positioning of the tool bit 190 of the cutter head assembly 160 is adjusted using the star feed gear 182 (and associated elements which control the radial travel of the tool block 168) so that the tool bit 190 is at a desired radial position. With the cutter head assembly 160 and extension means 144 secured to the drive shaft 86, feed pin 84 is inserted into a rim aperture 82 of the adjustment carriage 72 and rotated so that the tool bit 190 is proximate the top of the sidewall 30a. The retainer ring 112 is rotated to a position above the top of the cylindrical member 68 such that the distance separating the retainer ring 112 and the cylindrical member 68 corresponds to the desired depth of the sidewall 30a. At this position fasteners 118 in retainer ring 112 are tightened to preclude further axial movement of the adjustment carriage 72 once the carriage 72 has rotated sufficiently to displace it to the extent that the retainer ring 112 is flush against the top of the cylindrical member 68. The drive motor is connected to the top end 110 of the drive shaft 86 for rotating the drive shaft 86 and the cutter head assembly 160. Manual rotation of the feed pin 84 still inserted in a rim aperture 82 causes the adjustment carriage 72 to rotate within the prescribed limit and to progressively lower the tool bit 190 along the sidewall 30a.

Once the tool bit 190 has reached the bottom of the sidewall 30a of the lower seating surface 30 (which occurs when the retainer ring 112 is flush against the top of the cylindrical member 68), the cross-feed bar 122 is lowered into the chamber 16 to refinish the bottom wall 30b of the lower seating surface 30. The cylindrical member 140 at the lower end of the bar 122 contacts the star feed gear 182 once per revolution of the cutter head assembly 160, causing angular displacement of the star feed gear 182 and a radially inward displacement of the tool bit 190 in the manner described in the patent already incorporated herein by reference. In this respect, set screws 129 lock the cross-feed bar 122 into appropriate position while the tool 10 is operational.

As mentioned above, the valve body 12 of FIG. 1 basically differs from the valve body 12' of FIG. 2 in that it has no upper seating surface but instead has an essentially square-shaped circumferential rim 24. Thus, as seen in FIG. 1, the base plate 40 with its circumferential groove 42 sits squarely on the top surface 20 of the valve body 12. An adaptor ring is not required to elevate the tool 10 above the valve body's top surface 20 or to facilitate adjustment of the tool 10. The base plate 40 is secured to the top surface 20 of the valve body 12 using the valve studs 22 and the nuts 52 associated therewith. Once the base plate 40 has been mounted on the top surface 20 of valve body 12, the extension means 148 and cutter head assembly 160 are secured to the bottom end of the drive shaft 86 for either refinishing or boring the lower seating surface 30. In this respect, the sequence of operation for refinishing and/or boring the lower seating surface 30 of FIG. 1 is tha same as that discussed earlier with reference to the lower seating surface 30 of FIG. 2.

While the invention has been particularly shown and described with reference to preferred embodiments thereof, it will be understood by those skilled in the art that various changes in form and detail may be made therein without departing from the spirit and scope of the invention as defined by the appended claims. For example, the cross-feed bar 122 may be biased into position against the cap 125 by resilient means, such as a spring. Also, it should be understood that interchangeable tool bits may be used with tools of the invention.

The embodiments of the invention in which an exclusive property or privilege are claimed are defined as follows:

1. A tool for selectively boring and refinishing one or more seating surfaces in a valve body of an end-loading ball valve, said tool comprising:
    a base plate adapted to be secured to a planar top surface of a valve body;
    a tool housing secured to said base plate, said tool housing having an essentially cylindrical exterior surface about an axis perpendicular to said base plate, said cylindrical exterior surface having an essentially flat chord-like portion provided thereon, said tool housing further having an interior surface defining an essentially hollow interior, said interior surface being internally counter-threaded to receive an externally threaded member adapted to travel axially therein;
    input drive means;
    a cutter head assembly mounted on said drive means, said cutter head assembly having a tool bit mounted thereon for traversing a circular path about said axis, said cutter head assembly further comprising feed means for causing the radial displacement of said tool bit at a rate related to the circular velocity of said cutter head assembly when said feed means is engaged;
    drive means for transmitting rotary power between said input drive means and said cutter head assembly;
    means for adjusting the axial position of said cutter head assembly, said axial position adjustment means including said externally threaded member adapted to travel axially in said tool housing so that said cutter head assembly may be selectively lowered and raised to position said tool bit against the seating surface;
    a bar member adapted to engage said feed means for causing the radial displacement of said tool bit, said bar member being selectively movable through a continuum of positions along a direction parallel to said axis, said movement of said bar member facilitating the non-engagement of said feed means when radial displacement of said tool bit is not desired and facilitating the engagement of said feed means on said axially translatable cutter head assembly when said radial displacement of said tool bit is desired;
    channel-forming means secured to said essentially flat chord-like portion of said tool housing, said channel-forming means adapted to at least partially define a channel through which said bar member extends; and,
    means for selectively locking said bar member in said channel.

2. The tool of claim 1, wherein extension means couples said cutter head assembly to said drive transmitting means for permitting said cutter head assembly to be lowered into a valve chamber so that said tool bit is positioned against a seating surface.

3. The tool of claim 1, wherein the means for causing the radial displacement of said tool bit comprises:
    a cutter head body mounted on said cutter head assembly drive shaft;
    a slidably mounted tool block for carrying said tool bit in slidable relation to a face of said cutter head body;
    a feed screw fixedly attached to said tool block;
    an internally threaded gear on said feed screw which is restrained from axial movement by said cutter head body; and,
    means for rotating said internally threaded gear.

4. The tool of claim 3, wherein the means for rotating said internally threaded gear comprises:
    a shaft mounted on said cutter head body;

a second gear mounted on said shaft and engaging the internally threaded gear;

a star feed wheel mounted on said shaft; and, means disposed in the path of movement of said star feed for incrementally rotating the star feed wheel once for each rotation of said tool bit.

5. The tool of claim 1, wherein an adaptor means elevates said base plate above said top surface of said valve body, said adaptor means comprising an annular spacer member for facilitating the positioning of said tool bit against a seating surface.

6. The tool of claim 1, wherein said bar member has a first cross-sectional dimension W across a distal portion thereof and a second cross-sectional dimension w across a second portion thereof, the dimension W being greater than the dimension w, the dimension w being on the order of the width of said channel whereby the distal portion of said bar member is precluded from passing through said channel.

* * * * *